United States Patent [19]

Kawachi et al.

[11] Patent Number: 4,603,175

[45] Date of Patent: Jul. 29, 1986

[54] THERMOPLASTIC FLUOROELASTOMER COMPOSITION

[75] Inventors: Shoji Kawachi, Hyogo; Masayasu Tomoda, Shiga; Hiroyuki Tanaka; Mitsuru Kishine, both of Osaka, all of Japan

[73] Assignee: Daikin Industries, Inc., Osaka, Japan

[21] Appl. No.: 634,364

[22] Filed: Jul. 25, 1984

[30] Foreign Application Priority Data

Jul. 27, 1983 [JP] Japan .................... 58-138125

[51] Int. Cl.$^4$ .................................... C08F 259/00
[52] U.S. Cl. .................................... 525/276; 522/113; 525/263
[58] Field of Search .................... 525/276, 263

[56] References Cited

U.S. PATENT DOCUMENTS 4,487,882 12/1984 Ueta et al. .................... 525/276

*Primary Examiner*—Jacob Ziegler
*Attorney, Agent, or Firm*—Birch, Stewart, Kolasch & Birch

[57] ABSTRACT

A thermoplastic fluoroelastomer composition comprising a thermoplastic fluoroelastomer, a liquid fluoroelastomer and optionally a cross-linking agent, which is easily ejection molded and cross-linked at a room temperature to afford a cross-linked material having excellent heat resistance, oil resistance and corrosion resistance.

12 Claims, No Drawings

THERMOPLASTIC FLUOROELASTOMER COMPOSITION

FIELD OF THE INVENTION

The present invention relates to a thermoplastic fluoroelastomer composition. More particularly, it relates to a thermoplastic fluoroelastomer composition which is easily ejection molded and hardened at a room temperature.

BACKGROUND OF THE INVENTION

A thermoplastic fluoroelastomer has excellent heat resistance, abrasion resistance, chemical resistance, solvent resistance, oil resistance, etc. and is formed in the form of a tube, sheet, film and other forms (eg. O-ring, sealing materials, etc.) or applied on various substrates such as electric wires or cables, building materials, clamping devices, and so forth.

The thermoplastic fluoroelastomer is, as is understood from its nomenclature, plasticized when heated and easily molded. Since its plasticizing temperature is, however, usually higher than 200° C., special equipment is required for plasticizing it. In addition, special equipment for cross-linking is also required. When the thermoplastic fluoroelastomer is molded on the spot, it is necessary to formulate a composition which is molded and preferably hardened at room temperature. The thermoplastic fluoroelastomer is easily dissolved or dispersed in a medium to afford a composition hardenable at room temperature. However, an article having a larger thickness, such as an O-ring cannot be molded from a solution or dispersion.

As a result of extensive study, it has now been found that formulation of a liquid fluoroelastomer and, optionally, a cross-linking agent, in thermoplastic, fluoroelastomer, affords a composition which is easily ejection molded and hardened at room temperature.

SUMMARY OF THE INVENTION

According to one aspect of the invention, there is provided a thermoplastic fluoroelastomer composition comprising a thermoplastic fluoroelastomer, a liquid fluoroelastomer, and optionally a cross-linking agent.

According to another aspect of the invention, there is provided a formed article of the thermoplastic fluoroelastomer composition of the invention.

DETAILED DESCRIPTION OF THE INVENTION

The term "thermoplastic fluoroelastomer" herein used is intended to mean a fluoroelastomer which shows elasticity, like a cross-linked elastomer, at a comparatively low temperature (for example, temperature around a room temperature) and shows plastic flow when heated.

Preferred thermoplastic fluoroelastomers comprise a polymeric chain comprising at least one elastomeric polymer segment and at least one non-elastomeric polymer segment, at least one of these segments being a fluorine-containing polymer segment. Preferably, the weight ratio of the elastomeric polymer segment and the non-elastomeric polymer segment is from 40:60 to 95:5.

More preferred thermoplastic fluoroelastomers comprise a polymeric chain comprising two or three polymer segments, at least one iodine atom liberated from an iodinated compound and bonded to a terminal carbon atom of the polymeric chain and a fragment of the iodinated compound excluding the liberated iodine atom therefrom;

one polymer segment (when the polymeric chain comprises two polymer segments) or one or two polymer segments (when the polymeric chain comprises three polymer segments) being elastomeric polymer segment(s) having a molecular weight of from 30,000 to 1,200,000 selected from the group consisting of (1) a vinylidene fluoride/hexafluoropropylene or pentafluoropropylene/tetrafluoroethylene polymer in a molar ratio of 45–90:5–50:0–35 and (2) a perfluoro($C_1$–$C_3$-alkyl vinyl ether) (including those having plural ether linkages)/tetrafluoroethylene/vinylidene fluoride polymer in a molar ratio of 15–75:0–85:0–85;

other polymer segment(s) being a non-elastomeric polymer having a molecular weight of from 3,000 to 400,000 selected from the group consisting of (3) a vinylidene fluoride/tetrafluoroethylene polymer in a molar ratio of 0:100 to 100:0 and (4) a ethylene/tetrafluoroethylene/hexafluoropropylene, 3,3,3-trifluoropropylene-1, 2-trifluoromethyl-3,3,3-trifluoropropylene-1 or perfluoro($C_1$–$C_3$-alkyl vinyl ether) (including those having plural ether linkages) polymer in a molar ratio of 40–60:60–40:0–30, and the weight ratio of the elastomeric polymer segment and the non-elastomeric polymer segment being from 40:60 to 95:5.

The above described preferred thermoplastic iodine-containing fluoroelastomer is disclosed in Japanese Patent Publication No. 4728/1983 and U.S. Pat. No. 4,158,678, the disclosure of which is hereby incorporated by reference.

The liquid fluoroelastomer is a fluoroelastomer having an average molecular weight of from 500 to 20,000, preferably from 500 to 10,000 and is liquid at room temperature. Specific examples of the liquid fluoroelastomer are vinylidene fluoride/hexafluoropropylene elastomers, vinylidene fluoride/hexafluoropropylene/tetrafluoroethylene elastomers, tetrafluoroethylene/propylene elastomers, hexafluoropropylene/ethylene elastomers, fluorosilicone elastomers, fluorophosphazene elastomers and olefine-containing fluoroelastomers, each of which has a molecular weight in the above range.

A weight ratio of the thermoplastic fluoroelastomer and the liquid fluoroelastomer is prefrably from 95:5 to 20:80, more preferably from 95:5 to 30:70. When the content of the thermoplastic fluoroelastomer is more than the upper limit, the properties of the cross-linked composition are deteriorated, and when it is less than the lower limit, the flowability of the composition before hardening is deteriorated.

The composition of the invention may optionally contain various fillers which are added to the conventional fluoroelastomer composition such as carbon black, graphite, silica, diatomaceous earth, talc, etc. In addition, it may contain powdery fluororesin.

As the cross-linking agent to be optionally added to the composition of the invention, any one that is known as a cross-linking agent for the conventional fluoroelastomer may be used. Specific examples of the cross-linking agent are organic peroxide compounds, polyhydroxy compounds/cross-linking accelerators and polyamine compounds. The composition containing the cross-linking agent can be cross-linked by a per se conventional method. The cross-linking of the composition may be also effected by light or less preferably by heat. In such a case, a light or heat sensitive compound is preferably added to the composition. Further, the cross-linking of the composition may be effected by radiation.

When the cross-linking of the composition is effected by the use of the organic peroxide compound or by radiation, a polyfunctional compound is preferably added to the composition. Examples of the polyfunctional compound are those bearing as the functional group at least one of $CH_2=CH-$, $CH_2=CH-CH_2-$ and $CF_2=CF-$.

An amount of the cross-linking agent to be added to the composition is from 0.1 to 10 parts by weight, preferably from 0.5 to 5 parts by weight based on 100 parts by weight of the thermoplastic fluoroelastomer. When the cross-linking accelerator is used, it is added in an amount of from 0.05 to 10 parts by weight, preferably from 0.1 to 5 parts by weight based on 100 parts by weight of the thermoplastic fluoroelastomer.

The composition of the invention is prepared by a per se conventional method by the use of a open roll mill or a mixer.

The composition of the invention may be formed in a suitable form such as a tube or a strand by extruding or molding it at a temperature of from 60° to 100° C. The formed article may be reinforced with carbon fiber, glass fiber, Goretex (trade mark), Kevler (trade name) fiber, etc. The formed article is preferably hardened by cooling it to room temperature.

The thus formed article of the invention may be cross-linked by heating it at a temperature of from 100° to 200° C. for 5 minutes to 3 hours. The cross-linked article has excellent heat resistance, oil resistance, corrosion resistance and further good mechanical properties. The addition of the liquid fluoroelestomer to the thermoplastic elestomer reduces the modulus, hardness and Tg of the fluoroelestomer composition.

PREFERRED EMBODIMENTS OF THE INVENTION

The present invention will be hereinafter explained further in detail by the following Examples, in which parts are by weight.

EXAMPLE 1 AND COMPARATIVE EXAMPLES 1 AND 2

A thermoplastic fluoroelastomer was kneaded by winding it around rolls of 8 inch-open rolls which were rotated at a revolution ratio of 22/18 rpm. Then, a predetermined amount of a liquid fluoroelastomer was added by portions and thoroughly mixed. Thereafter, a cross-linking agent, and cross-linking accelerator and a filler were added and mixed. The thus prepared composition was kept at a room temperature overnight. It was charged in a mole and subjected to primary cross-linking at 160° C. for 10 minutes followed by secondary cross-linking in a furnace kept at 180° C. for 4 hours. The mechanical properties of the cross-linked material are shown in Table 1.

As understood from these results, the composition of the invention has superior roll processability to the compositions of Comparative Examples.

TABLE 1

|  | Example 1 | Comparative Example 1 | Comparative Example 2 |
|---|---|---|---|
| Thermoplastic fluoroelastomer (parts) | 100[1] | 100[1] | — |
| Solid fluoroelastomer (parts) | — | — | 100[2] |
| Liquid fluoroelastomer (parts) | 30[3] | — | 30[3] |
| Triallyisocyanurate (parts) | 3 | 3 | 3 |
| Perhexa-2.5-B (parts) | 1 | 1 | 1 |
| Medium thermal carbon (parts) | 10 | 10 | 10 |
| Roll processability (time, min) | Excellent (ca. 15) | Good (ca. 20) | Poor (ca. 40) |
| Crosslinkability | Good | Good | Tend to foam |
| $M_{100}$ (Kg/cm$^2$) | 15 | 26 | 6 |
| $T_B$ (Kg/cm$^2$) | 167 | 199 | 65 |
| $E_B$ (%) | 500 | 450 | 750 |
| Hs (JIS A) | 54 | 65 | 50 |

Note:
[1] DAI-EL (trade mark) thermoplastic T 630 (manufactured by Daikin Industries Ltd.)
[2] DAI-EL G 901 (solid fluoroelastomer having an average molecular weight of 160,000 manufactured by Daikin Industries Ltd.)
[3] DAI-EL G 101 (fluoroelastomer having an average molecular weight of 2,800 manufactured by Daikin Industries Ltd.)

EXAMPLES 2–4 AND COMPARATIVE EXAMPLE 3

Flow characteristics of a composition shown in Table 2 were measured by means of a Koka-type flow tester. The measuring conditions were as follows:
Temperature: 100° C.
Pressure: 70 Kg/cm$^2$
Nozzle: 1 mm (diameter)×1 mm (length)
The appearance of the sample piece was observed and evaluated as follows:
VS: Very smooth
S: Smooth
R: Rough
C: Cracked
The results are shown in Table 2.

TABLE 2

|  | Example 2 | Example 3 | Example 4 | Comparative Example 3 |
|---|---|---|---|---|
| Thermoplastic fluoroelastomer[1] (parts) | 100 | 100 | 100 | 100 |
| Liquid fluoroelastomer (parts) | 30 | 30 | 30 | — |
| Medium thermal carbon (parts) | — | 10 | — | — |
| Flow rate (cm$^3$/min.) | 2.7 | 2.8 | 7.2 | 0.013 |
| Appearance | S | S | VS | C |

Note:
[1] See Note (1) of Table 1

EXAMPLE 5 AND COMPARATIVE EXAMPLES 4 AND 5

After kneading a thermoplastic fluoroelastomer in the same manner as in Example 1, a liquid or solid fluoroelastomer was added by portions in a predetermined amount and thoroughly mixed. The thus prepared composition was charged in a mold for P-24 O-rings and pressed at 230° C. under 40 Kg/cm$^2$G for 3 minutes.

Properties of the obtained O-ring are shown in Table 3. Tg was measured by a differential scanning calorimeter (DSC).

From these results, it is clear that the modulus, hardness and Tg of the composition of Example 5 are reduced in comparison with those of Comparative Examples 4 and 5.

TABLE 3

| | Example 5 | Comparative Example 4 | Comparative Example 5 |
|---|---|---|---|
| Thermoplastic fluoroelastomer (parts) | 100[1] | 100[1] | 100[1] |
| Liquid fluoroelastomer (parts) | 67[2] | — | — |
| Solid fluoroelastomer (parts) | — | — | 67[3] |
| $M_{100}$ (Kg/cm$^2$) | 6 | 17 | — |
| Hs (JIS A) | 36 | 62 | — |
| Tg (°C.) | −22 | −9 | −9 |

Note:
[1]DAI-EL (trade mark) thermoplastic T 530 (manufactured by Daikin Industries Ltd.)
[2]Copolymer of vinylidene fluoride/hexafluoropropylene/tetrafluoroethylene in a molar ratio of 50/30/20 having an average molecular weight of 3,000
[3]See Note (2) of TABLE 1

EXAMPLE 6

In the same manner as in Example 1, 20 parts of the thermoplastic fluoroelastomer (DAI-EL T 530) and parts of the same liquid fluoroelastomer as used in Example 5 were mixed. The thus prepared composition was a putty-like material which did not flow in a temperature range between a room temperature and 150° C. under no stress but was freely deformed under stress.

What is claimed is:

1. A thermoplastic fluoroelastomer composition comprising a thermoplastic fluoroelastomer, and a liquid fluoroelastomer which is a fluoroelastomer having an average molecular weight of from 500 to 20,000 and is liquid at room temperature.

2. A composition according to claim 1, wherein said thermoplastic fluoroelastomer comprises a polymeric chain comprising at least one elastomeric polymer segment and at least one non-elastomeric polymer segment, at least one of the segments being a fluorine-containing polymer segment.

3. A composition according to claim 2, having a weight ratio of the elastomeric polymer segment and the non-elastomeric polymer segment of from 40:60 to 95:5.

4. A composition according to claim 1, wherein said thermoplastic fluoroelastomer comprises a polymeric chain comprising two polymer segments, at least one iodine atom liberated from an iodinated compound bonded at a terminal carbon atom of the polymeric chain and a fragment of the iodinated compound excluding said liberated iodine atom therefrom bonded at another terminal carbon atom of the polymeric chain;

one polymer segment being an elastomeric polymer segment, having a molecular weight of from 30,000 to 1,200,000, selected from the group consisting of (1) a vinylidene fluoride/hexafluoropropylene or pentafluoropropylene/tetrafluoroethylene polymer in a molar ratio of 45–90:5–50:0–35 and (2) a perfluoro($C_1$–$C_3$)-alkyl vinyl ether either of which may have plural ether linkages/tetrafluoroethylene/vinylidene fluoride polymer in a molar ratio of 15–75:0–85:0–85; and the remaining polymer segment being a non-elastomeric polymer, having a molecular weight of from 3,000 to 400,000, selected from the group consisting of (3) a vinylidene fluoride/tetrafluoroethylene polymer in a molar ratio of 0:100 to 100:0 and (4) a ethylene/tetrafluoroethylene/hexafluoropropylene copolymer, a 3,3,3-trifluoropropylene-1 polymer, a 2-trifluoromethyl-3,3,3-trifluoropropylene-1 polymer or perfluoro($C_1$–$C_3$)-alkyl vinyl ether polymer which may have plural ether linkages, in a molar ratio of 40–60:60–40:0–30, wherein said elastomeric polymer segment and said non-elastomeric polymer segment have a weight ratio of from 40:60 to 95:5.

5. A composition according to claim 1, having a weight ratio of said thermoplastic fluoroelastomer and said liquid fluoroelastomer of from 95:5 to 30:70.

6. A composition according to claim 1 which comprises a cross-linking agent.

7. A composition according to claim 1, wherein said liquid fluoroelastomer is selected from the group consisting of vinylidene fluoride/hexafluoropropylene elastomers, vinylidene fluoride/hexafluoropropylene/tetrafluoroethylene elastomers, tetrafluoroethylene/propylene elastomers, hexafluoropropylene/ethylene elastomers, fluorsilicone elastomers, and fluorophosphazene elastomers, each of which has an average molecular weight of from 500–10,000.

8. An article formed of a thermoplastic fluoroelastomer composition according to claim 1.

9. A article according to claim 8, which is a tube or a strand.

10. A article according to claim 8, which is an O-ring.

11. A composition according to claim 1, wherein said thermoplastic fluoroelastomer comprises a polymeric chain comprising three polymer segments, at least one iodine atom liberated from an iodinated compound bonded at a terminal carbon atom of the polymeric chain and a fragment of the iodinated compound excluding said liberated iodine atom therefrom bonded at another terminal carbon atom of the polymeric chain;

one polymer segment being an elastomeric polymer segment having a molecular weight of from 30,000 to 1,200,000, selected from the group consisting of (1) a vinylidene fluoride/hexafluoropropylene or pentafluoropropylene/tetrafluoroethylene polymer in a molar ratio of 45–90:5–50:0–35 and (2) a perfluoro($C_1$–$C_3$)-alkyl vinyl ether either of which may have plural ether linkages/tetrafluoroethylene/vinylidene fluoride polymer in a molar ratio of 15–75:0–85:0–85, and the remaining polymer segments being a non-elastomeric polymer, having a molecular weight of from 3,000 to 400,000, selected from the group consisting of (3) vinylidene fluoride/tetrafluoroethylene polymer in a molar ratio of 0:100 to 100:0 and (4) a ethylene/tetrafluoroethylene/hexafluoropropylene copolymer, a 3,3,3-trifluoropropylene-1 polymer, a 2-trifluoromethyl-3,3,3-trifluoropropylene-1 polymer, or a perfluoro($C_1$–$C_3$)-alkyl vinyl ether polymer which may have plural ether linkages, in a molar ratio of 40–60:60–40:0–30, wherein said elastomer polymer segment and said non-elastomeric polymer segment have a weight ratio of 40:60 to 95:5.

12. A composition according to claim 1, wherein said thermoplastic fluoroelastomer comprises a polymeric chain comprising three polymer segments, at least one iodine atom liberated from an iodinated compound bonded at a terminal carbon atom of the polymeric chain and a fragment of the iodinated compound excluding said liberated iodine atom therefrom bonded at another terminal carbon atom of the polymeric chain;

two polymer segments being elastomeric polymer segments having a molecular weight of from 30,000 to 1,200,000, selected from the group consisting of (1) a vinylidene fluoride/hexafluoro-propylene or pentafluoropropylene/tetrafluoroethylene polymer in a molar ratio of 45–90:5–50:0–35 and (2) a perfluoro($C_1$–$C_3$)-alkyl vinyl ether either of which may have plural ether linkages/tetrafluoroethyelene/vinylidene fluoride polymer in a molar ratio of 15–75:0–85:0–85, and the remaining polymer segment being a non-elastomeric polymer, having a molecular weight of from 3,000 to 400,000, selected from the group consisting of (3) a vinylidene fluoride/tetrafluoroethylene polymer in a molar ratio of 0:100 to 100:0 and (4) a ethylene/tetrafluoroethylene/hexafluoropropylene copolymer, a 3,3,3-trifluoropropylene-1 polymer, a 2-trifluoromethyl-3,3,3-trifluoropropylene-1 polymer or a perfluoro($C_1$–$C_3$)-alkyl vinyl ether polymer which may have plural ether linkages, in a molar ratio of 40–60:60–40:0–30, wherein said elastomeric polymer segment and said non-elastomeric polymer segment have a weight ratio of 40:60 to 95:5.

* * * * *